United States Patent
Mehta et al.

(10) Patent No.: US 11,138,204 B2
(45) Date of Patent: Oct. 5, 2021

(54) METRIC DETERMINATION FOR AN INTERACTION DATA STREAM USING MULTIPLE DATABASES

(71) Applicant: salesforce.com, inc., San Francisco, CA (US)

(72) Inventors: Percy Dara Mehta, Foster City, CA (US); Yogesh Prabhudas Patel, Dublin, CA (US); Shaahin Mehdinezhad Rushan, Dublin, CA (US); Mattia Padovani, San Francisco, CA (US); Aaron Yulong Zhang, Richmond Hill (CA); Shan-Cheng Ho, Sunnyvale, CA (US); Clinton Tran, South San Francisco, CA (US); Birva Pankaj Joshi, Sunnyvale, CA (US); Mugdha Choudhari, San Carlos, CA (US); Johannes Kienzle, Oakland, CA (US)

(73) Assignee: salesforce.com, inc., San Francisco, CA (US)

(*) Notice: Subject to any disclaimer, the term of this patent is extended or adjusted under 35 U.S.C. 154(b) by 244 days.

(21) Appl. No.: 16/530,680

(22) Filed: Aug. 2, 2019

(65) Prior Publication Data
US 2021/0034627 A1    Feb. 4, 2021

(51) Int. Cl.
*G06F 16/30* (2019.01)
*G06F 16/2455* (2019.01)
*G06F 16/28* (2019.01)

(52) U.S. Cl.
CPC ...... *G06F 16/24568* (2019.01); *G06F 16/285* (2019.01)

(58) Field of Classification Search
CPC . G06F 16/24568; G06F 16/285; G06F 16/904
(Continued)

(56) References Cited

U.S. PATENT DOCUMENTS

6,385,604 B1    5/2002 Bakalash et al.
6,505,205 B1    1/2003 Kothuri et al.
(Continued)

*Primary Examiner* — Sana Al-Hashemi
(74) *Attorney, Agent, or Firm* — Kowert, Hood, Munyon, Rankin & Goetzel, P.C.

(57) ABSTRACT

Techniques are disclosed for generating metrics for a stream of interaction data. In some embodiments, a computing system receives a stream of interaction data that is based on user interactions with one or more computing systems, where the stream of interaction data includes information for multiple interaction characteristics including an interaction category. In response to receiving additional interaction information in the stream of interaction data, the computing system may generate cumulative metric values for one or more interaction categories. Generating cumulative metric values may include: sharding the additional interaction information based on multiple characteristics including interaction category, storing the sharded information in a non-relational database, determining respective metric values for shards modified by the storing, storing the respective metric values and shard information for each of the modified shards in a relational database, querying the relational database using one or more interaction categories corresponding to the modified shards, and determining the cumulative metric values based on the results of the querying.

20 Claims, 8 Drawing Sheets (58) Field of Classification Search
USPC ........ 707/609, 687, 705, 769, 790, 813, 821
See application file for complete search history.

(56) References Cited

U.S. PATENT DOCUMENTS

| | | | |
|---|---|---|---|
| 2002/0091991 A1* | 7/2002 | Castro | G06F 9/06 717/106 |
| 2008/0065471 A1* | 3/2008 | Reynolds | G06Q 30/0203 705/7.32 |
| 2008/0104496 A1* | 5/2008 | Williams | G06Q 30/02 715/209 |
| 2017/0235848 A1* | 8/2017 | Van Dusen | G06F 16/904 705/12 |
| 2017/0364274 A1* | 12/2017 | Hammons | G06F 11/1451 |

* cited by examiner

*Non-relational database sharded by time interval and interaction category*

Shard (ListEmail1, Day 1):    Org1, ListEmail1, Day 1, Open, Clinton
                              Org1, ListEmail1, Day 1, Open, Percy Shard (ListEmail1, Day 10):   Org2, ListEmail1, Day 10, Open, Clinton Shard (ListEmail4, Day 1):    Org3, ListEmail4, Day 1, Open, Percy
                              Org1, ListEmail4, Day 1, LinkClick, Percy
                              Org1, ListEmail4, Day 1, Open, Clinton

*Relational database for non-unique metrics*

| Interaction category 512 | Day 514 | Non-unique count 516 | Interaction activity 518 |
|---|---|---|---|
| ListEmail1 | 1 | 2 | Open |
| ListEmail1 | 10 | 1 | Open |
| ListEmail4 | 1 | 2 | Open |
| ListEmail4 | 1 | 1 | LinkClick |

*Fig. 5*

*Interaction data (potentially a subset)*

Org1, ListEmail1, Open, HashOutputA, Percy, Time1
Org1, ListEmail1, Open, HashOutputA, Percy, Time2
Org1, ListEmail1, View, HashOutputA, Johannes, Time1
Org1, ListEmail1, Open, HashOutputB, Clinton, Time 1
Org1, ListEmail1, Open, HashOutputB, Clinton, Time 2

*Non-relational database sharded by hash of interactor identifier and interaction category*

Shard (ListEmail1, HashOutputA): Org2, ListEmail1, Open, HashOutputA, Percy
Org1, ListEmail1, View, HashOutputA, Johannes Shard (ListEmail1, HashOutputB): Org1, ListEmail1, Open, HashOutputB, Clinton

*Relational database for unique metrics*

| Interaction category 612 | Hash output 614 | Unique count 616 |
|---|---|---|
| ListEmail1 | HashOutputA | 2 |
| ListEmail1 | HashOutputB | 1 |

*Fig. 6*

Receive a stream of interaction data that is based on user interactions with one or more computing systems, where the stream of interaction data includes information for multiple interaction characteristics and the multiple interaction characteristics include an interaction category
710

Generate cumulative metric values for one or more interaction categories in response to receiving additional interaction information in the stream of interaction data
720

Store the additional interaction information in a non-relational database, including sharding the information based on multiple characteristics including interaction category
730

Determine respective metric values for shards modified by the storing
732

Store the respective metric values and shard information for each of the modified shards in a relational database
734

Query the relational database using one or more interaction categories corresponding to the modified shards
736

Determine, based on the results of the querying, the cumulative metric values for the one or more interaction categories
738

METRIC DETERMINATION FOR AN INTERACTION DATA STREAM USING MULTIPLE DATABASES

BACKGROUND

Technical Field

This disclosure relates generally to processing data streams, and, more specifically, to database techniques for generating metrics for a stream of interaction data.

Description of the Related Art

Some processing systems receive large-volume streams of data from various sources, such as software as a service (SaaS) platforms. The processing systems may store this large volume of data and provide information or metrics to other systems based on processing the stored data. As the volume of data that the system receives increases, traditional systems may experience performance degradation. For example, to generate a report for the stream of data in real time, a traditional processing system may make multiple queries over an entire datastore (containing the large volume of data from the stream).

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing system configured to process a stream of interaction data" is intended to cover, for example, a computer system having, for example, a processor, network interface, memory having program instructions, etc. to perform this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example. When used herein, the term "or" is used as an inclusive or and not as an exclusive or. For example, the phrase "at least one of x, y, or z" means any one of x, y, and z, as well as any combination thereof (e.g., x and y, but not z or x, y, and z).

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In various situations a system may process a high-volume of data flowing from one or more streams of interaction data received from different sources. In some embodiments, the different sources include software as a service (SaaS) platforms, such as Pardot, High Velocity Sales (HVS), MCA^2, etc. that facilitate interaction or record information from different interactors (e.g., entities, users, accounts, tenants, etc.). In some embodiments, the interaction data from multiple different sources is aggregated to generate a single stream of interaction data to be processed. In some embodiments, the system processes the aggregated stream of interaction data to generate metrics for the data in real time. For example, the system may determine cumulative metrics such as counts for different types of interactions. The system may store interaction data in a non-relational database as it is received, e.g., using a specific sharding strategy based on metrics to be generated. Then, the system may use a relational database to store determined intermediate metrics for the interaction data stored in the non-relational database. Storing intermediate metrics may assist in determining one or more cumulative metrics for the stream of interaction data.

In some embodiments, an interaction system shards interaction information by interaction category and time interval. One example of an interaction category is an interaction based on a particular email list. An interaction category may also be referred to as an "asset." For example, the interaction system may store information for an interaction in a particular shard, based on an email list associated with the interaction and a date on which the interaction occurred. To determine a count for the email list on the date, the interaction system may query the non-relational database and store the returned count in a relational database. To determine a cumulative count for the email list, the interaction system may query the relational database for the email list to access all database records (with daily counts) that match the email list. Although counts of various types of interactions are discussed herein for purposes of illustration, similar techniques may be used to determine various other metrics, in various embodiments.

In some embodiments, the interaction processing system determines multiple different types of cumulative metrics for a stream of interaction data. For example, the system may include multiple interactions from the same interactor in a given interaction category when determining a count for that category. As another example, the system may count only a single interaction per interaction category from a given interactor. In this example, if two interactions with the same interaction category are recorded from a given user, only one of the two interactions will be included in the count for the interaction category. Note that these example types of cumulative metrics are included for illustrative purposes but are not intended to limit the scope of the present disclosure.

Overview of an Interaction Processing System

Figure 1:
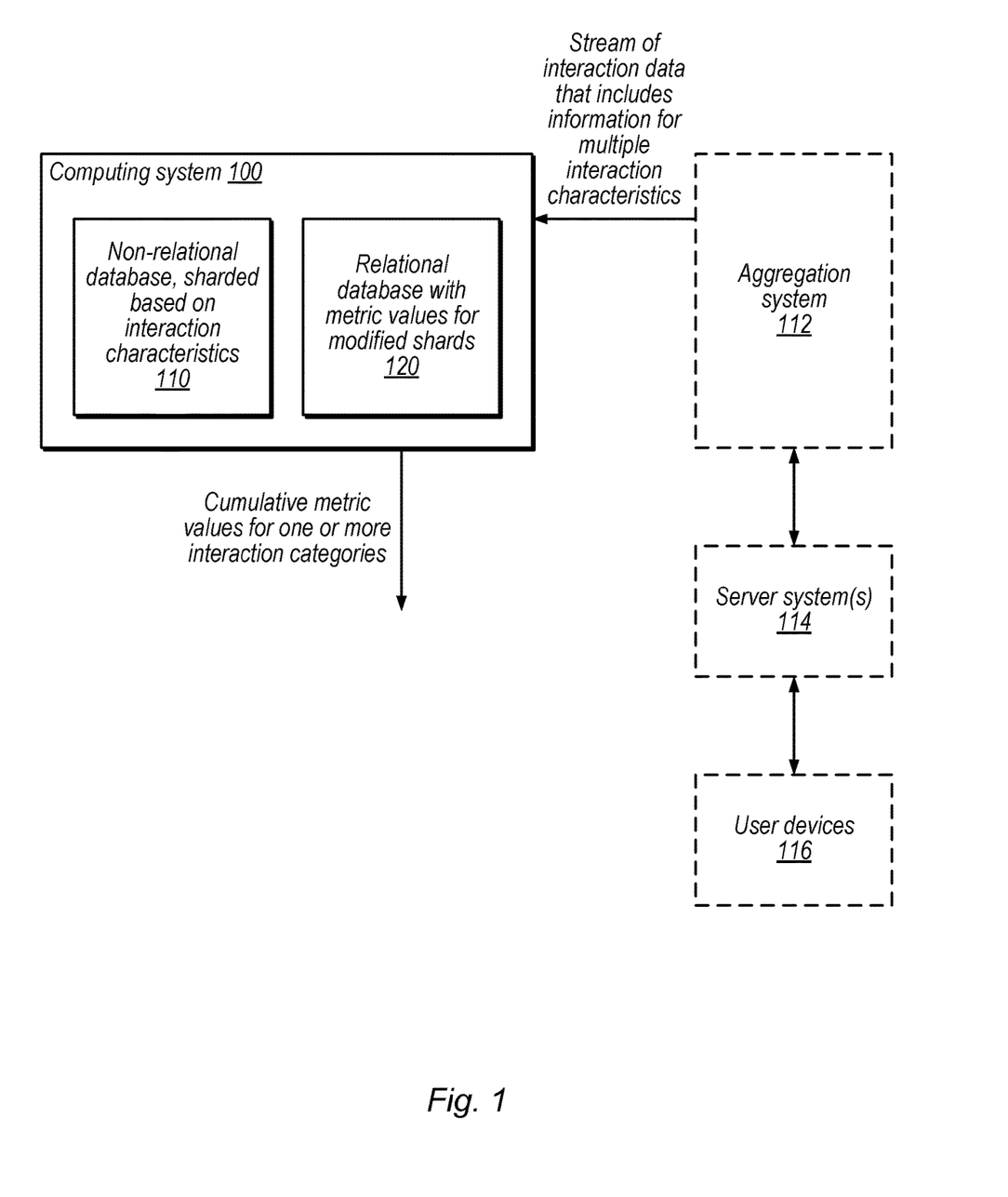
FIG. 1 is a block diagram illustrating a system configured to process a stream of interaction data, according to some embodiments.

FIG. 1 is a block diagram illustrating an overview of a computing system configured to process a stream of interaction data that includes information for multiple interaction characteristics, according to some embodiments. In the illustrated embodiment, computing system 100 includes non-relational database 110 and relational database 120, and is configured to process a stream of interaction data. In the illustrated example, the stream of interaction data is generated by aggregation system 112, which receives interaction information from one or more server systems 114 based on interactions with user devices 116. While the aggregation system, server system(s), and user devices provide an example topology for generating a stream of interaction data based on user interactions with computing systems, these elements are shown using dotted lines to indicate that these elements may not be part of the processing system and that various types of systems may generate a stream of interaction data.

Computing system 100, in the illustrated embodiment, receives a stream of interaction data that includes information for multiple interaction characteristics. Computing system 100 includes a non-relational database 110 that is sharded based on one or more interaction characteristics and a relational database 120 that stores metric values for one or more modified shards of the non-relational database 110. In some embodiments, non-relational database 110 and relational database 120 are maintained separately from computing system 100 and are accessed by computing system 100 to process the stream of interaction data. In some embodiments, non-relational database 110 stores interaction data across different server systems to advantageously prevent or reduce overloading computing resources (e.g., central processing unit (CPU), memory, etc.) used to process the stream of interaction data. In some embodiments, computing system 100 stores interaction data in one or more shards of the non-relational database 110 based on at least the interaction category associated with one or more portions of the interaction data. Note that interaction category is one example interaction characteristic that may be included in the stream of interaction data. Storing sharded interaction information in a non-relational database is discussed in further detail below with reference to FIGS. 2 and 3.

Examples of interaction characteristics included in the stream of interaction data may include, without limitation: an interactor identifier (e.g., that identifies a user, an account, a tenant, an entity, a device, etc.), associated software resources, a timestamp, an interaction category, interaction activity, contact information, login credentials, cookie data, survey results, etc. In some embodiments, interaction activities include one or more of the following: opening an email, replying to an email, selecting (e.g., a link, an image, etc. for an email or a web form), bouncing of an email (soft or hard bounce), submitting a spam complaint, viewing (e.g., an online form or survey), submitting information, reporting an error, etc. In some embodiments, the timestamp characteristic includes a time at which an interaction occurred or the date on which the interaction occurred. In some embodiments, associated software resources may be indicated by an organization identifier that specifies versions or types of software associated with an interaction. Note that an organization identifier, e.g., a Salesforce organization ID, may specify a version of a software application and data within an instance of the software application for a given user, account, tenant, entity, etc. For example, the organization identifier may be used to link specific data from a shared database, within a multi-tenant database system, to a specific tenant or entity. In this example, the organization identifier may be stored in the shared multi-tenant database with the corresponding tenant data.

As used herein, the term "interaction category" refers to a defined set of potential interactions, which may be defined based on a medium used to initiate interaction, information identifying a set of potential interactors, or a specific user interface or type of user interface used to initiate interaction, for example. Interaction categories may include, without limitation: an email list (e.g., used for email marketing), a web form or marketing form (e.g., surveys, shipping, registration, contact information, sales contact, payment, etc.), phone surveys, an email template (e.g., an HTML file used to generate email campaigns), a website template, presentations, brochures, etc. As a specific example, a web form may prompt a user, who is browsing through products online, to fill out a survey. Based on the user's actions, the system may record information associated with the interaction.

Computing system 100 may receive a stream of interaction data in real time. For example, system 100 may receive additional interaction information at various points in time as interactions occur. As it receives additional interaction information, computing system 100 may determine or update one or more metric values. Before determining metric values based on the additional interaction information, computing system 100 may store the additional interaction information in non-relational database 110. Then, computing system 100 may query non-relational database 110 to determine respective metric values for shards modified by storing the additional interaction information from the stream of interaction data. In some embodiments, this hierarchical approach may advantageously allow metrics to be updated in real time, e.g., within seconds or minutes of stream updates.

In the illustrated example, after determining metric values for each modified shard in non-relational database 110, computing system 100 stores the metric for each of the modified shards in relational database 120. Note that the metric values stored in the relational database may be intermediate metric values that are used to calculate final or cumulative metric values. In some embodiments, the shard information stored in relational database 120 includes values for one or more interaction characteristics. Example shard information is discussed in detail below with reference to FIGS. 2 and 3.

Computing system 100, in the illustrated embodiment, outputs cumulative metric values for one or more interaction categories. In some embodiments, computing system 100 queries the relational database 120 using one or more interaction categories corresponding to the modified shards of the non-relational database 110. Based on the results of the query, computing system 100 may determine cumulative metric values for the one or more interaction categories. Note that determining cumulative metric values is discussed in detail below with reference to FIGS. 2 and 3.

In some embodiments, computing system 100 sends the cumulative metric values for one or more interaction categories to an administration system (not shown) that is configured to adjust one or more parameters for one or more server systems 114 that interact with one or more user devices 116. For example, the parameters may control how interactions are initiated, e.g., by adjusting the communications medium, formatting, timing, etc. In some embodiments, the administration system communicates with one or more server systems 114 to adjust parameters.

In some embodiments, aggregation system 112 sends a stream of interaction data to computing system 100. In some embodiments, one or more server systems 114 record interaction data from various users as interaction events and provide data for detected interaction events to aggregation system 112. For example, a first server system 114 may send emails to a first user device 116 based on an email list, while a second server system 114 may send a web form (e.g., to collect contact information) to a second user device 116. The servers may then generate data based on user interaction with the servers. Note that server system 114 may implement a SaaS, such as Pardot. In some embodiments, aggregation system 112 generates a stream of interaction data based on the respective interaction data provided by one or more server systems 114.

As used herein, the term "sharding" refers to its well-understood meaning in the context of non-relational databases, which includes partitioning contents of a database. In some embodiments, the contents of a database are partitioned horizontally (by row). Accesses to the non-relational database indicate a shard being accessed, e.g., using a shard identifier. For example, a shard identifier may indicate information based on which the database is partitioned such as an interaction category and a time interval, in some embodiments, or an interaction category and a hash of an interactor identifier, in some embodiments (these specific example embodiments are discussed in detail below with reference to FIGS. 5 and 6, respectively.) In some embodiments, accesses to the database may indicate additional location information to identify one or more elements within an indicated shard.

As used herein, the term "multi-tenant database system" refers to those systems in which various elements of hardware and software of the database system are shared by one or more customers. For example, a computer system may simultaneously process requests for a great number of customers, and a database table may store rows for a potentially greater number of customers. In various embodiments, data for different tenants may be securely stored such that other tenants cannot access the data, absent permission.

Example Techniques for Generating Different Types of Metrics

Figure 2:
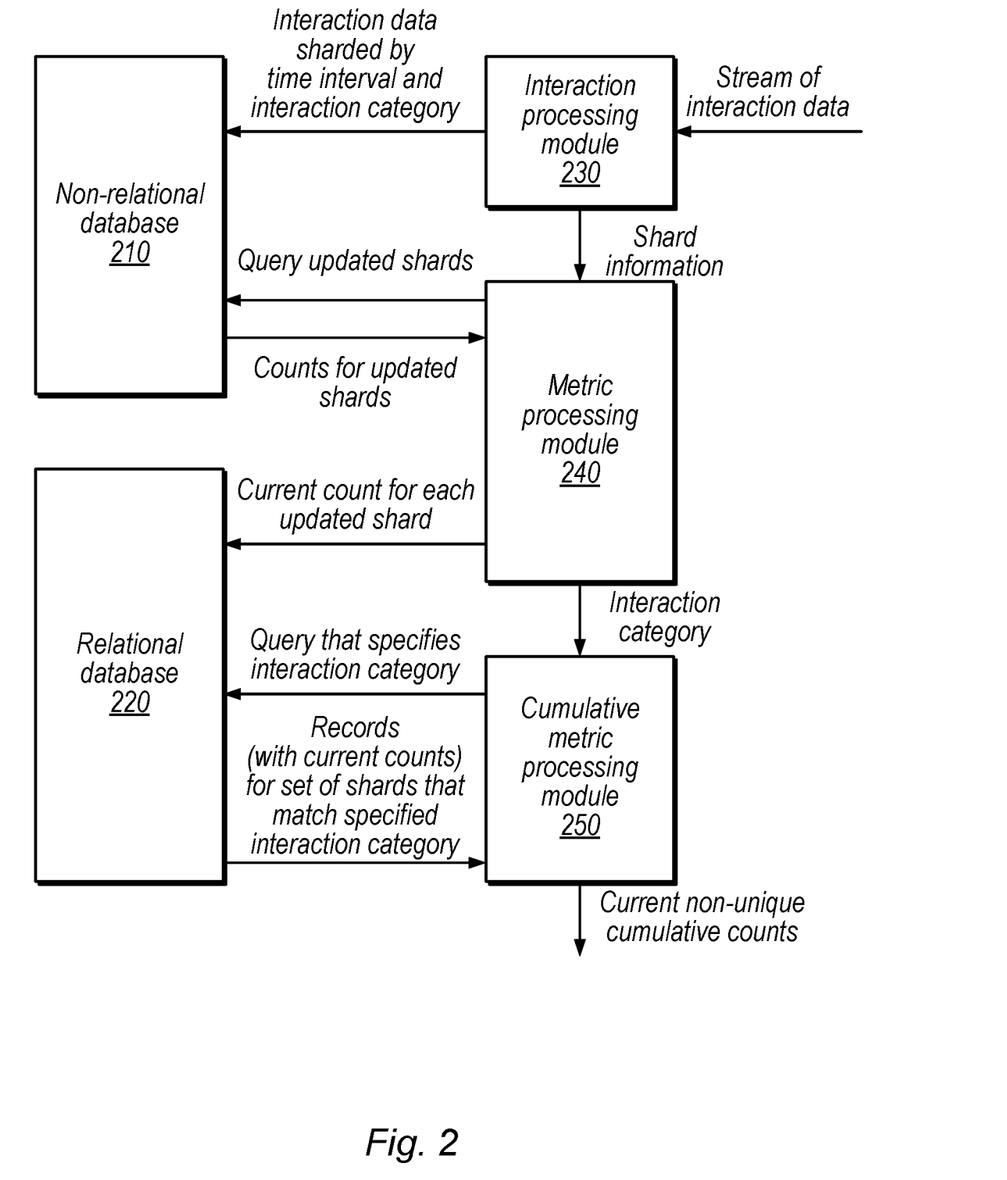
FIG. 2 is a block diagram illustrating example processing modules configured to determine current cumulative non-unique counts for a stream of interaction data, according to some embodiments.

FIG. 2 is a block diagram illustrating example processing modules configured to determine current cumulative non-unique counts for a stream of interaction data, according to some embodiments. In the illustrated embodiment, processing modules 230 and 240 use a non-relational database 210 and a relational database 220 to store interaction data and current counts, respectively, while a cumulative metric processing module 250 outputs current cumulative counts.

Interaction processing module 230, in the illustrated example, receives a stream of interaction data (e.g., in real time as new interaction data is generated). In the illustrated example, interaction processing module 230 stores the additional interaction data, sharded by time interval and interaction category, in non-relational database 210. Interaction processing module 230 also sends shard information, for each shard that was updated by the newly stored information, to metric processing module 240. In some embodiments, shard information includes values for one or more interaction characteristics that are associated with stored interactions. For example, shard information may include values for the following: associated software resources (indicated by an organization identifier), interaction category, timestamp, and interaction activity.

Non-relational database 210, in the illustrated embodiment, stores interaction data that is sharded based on a time interval and interaction category associated with each interaction. Upon receiving a query for one or more shards that were updated based on the additional interaction information, non-relational database 210 sends counts for the updated shards. In some embodiments, a count for a given shard is the number of entries (interaction events) stored within that shard. For example, non-relational database 210 may be a NoSQL database, such as the Apache Cassandra® database, that may provide respective counts for one or more shards. In this example, the system may determine counts based on a number of rows in each shard.

Metric processing module 240, in the illustrated example, determines a current count for each updated shard based on the counts from non-relational database 210. For example, based on data for one or more interactions being added to the non-relational database 210, metric processing module 240 determines an updated count (the most current count at a given time). Although metric processing module 240 determines counts in disclosed non-limiting examples, it may determine other metric values in various embodiments. Metric processing module 240 stores the determined current count for each updated shard in relational database 220. In some embodiments, metric processing module 240 checks for a previously-stored count for each updated shard and updates the count if present or creates a new count entry if not. In some embodiments, storing current counts for each updated shard in an intermediate storage (such as relational database 220) may advantageously decrease processing time for determining cumulative interaction metrics. In the illustrated example, metric processing module 240 sends information specifying the interaction category associated with each updated shard to the cumulative metric processing module 250. In some embodiments, metric processing module 240 sends information specifying one or more other interaction characteristics in addition to or in place of the information specifying the interaction category.

Relational database 220, in the illustrated example, receives a query from the cumulative metric processing module 250 that specifies an interaction category (e.g., associated with an updated shard). Based on the query, relational database 220 provides records that include current counts for a set of shards that match a specified interaction category. For example, relational database 220 may provide different counts (e.g., different values) from different records of relational database 220, where all of the counts are associated with the specified interaction category.

Cumulative metric processing module 250 determines a current cumulative count for the interaction category based on the records from relational database 220. In some embodiments, cumulative metric processing module 250 determines current cumulative counts for multiple interaction categories, based on different interaction categories from metric processing module 240. In the illustrated embodiment, cumulative metric processing module 250 outputs current non-unique, cumulative counts.

Figure 5:
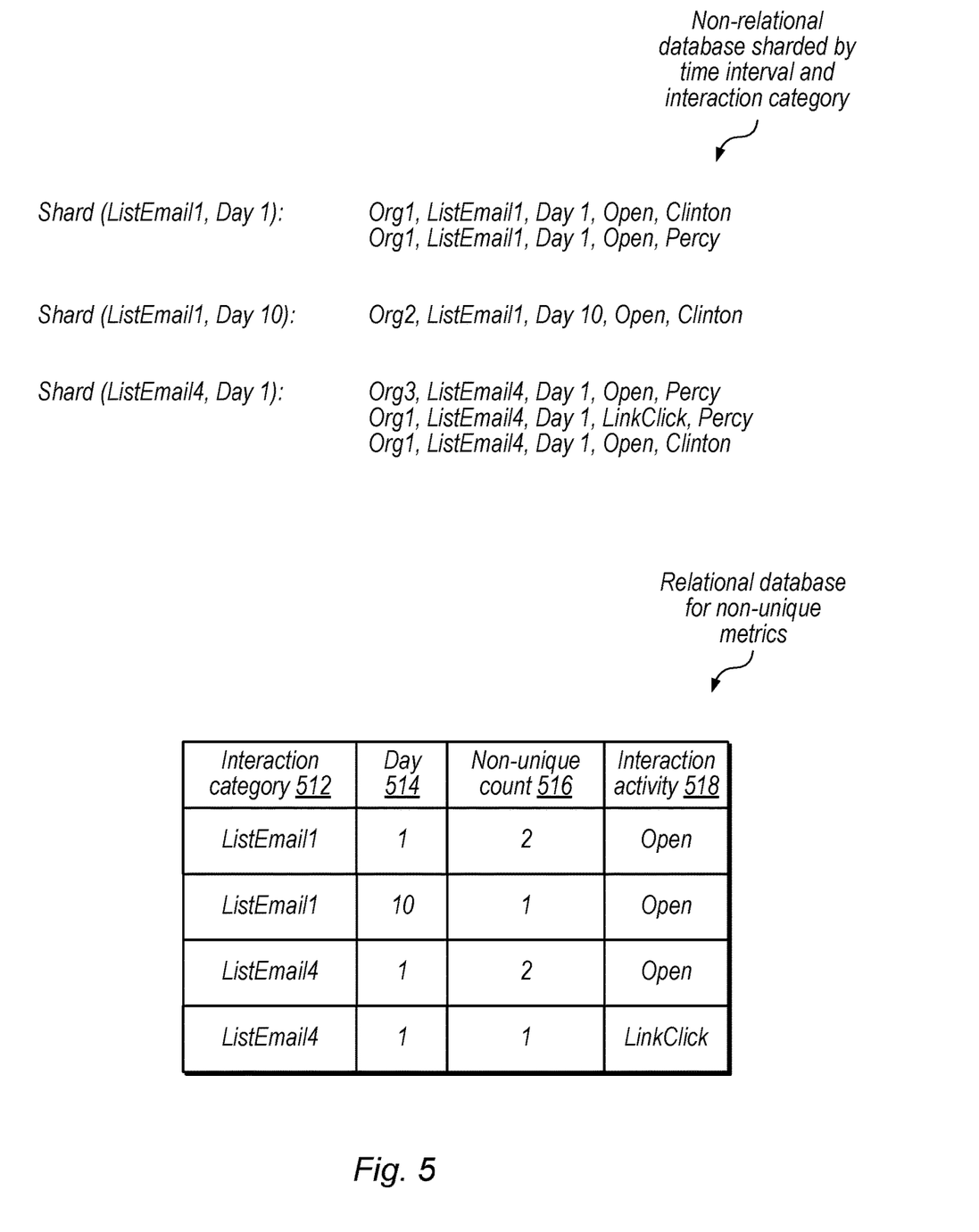
FIG. 5 is a diagram illustrating example contents of non-relational database shards and a schema and contents of a relational database configured to store non-unique metrics for a stream of interaction data, according to some embodiments.

As one specific example of the system shown in FIG. 2, interaction processing module 230 may receive a set of interaction data from aggregation system 112 with values for the following characteristics: organization identifier, interaction category, timestamp, interaction activity, and interactor identifier. In this specific example, for a given interaction, module 230 stores the values for organization identifier, interaction category, timestamp, and interaction activity as an entry in a shard of non-relational database 210. Module 230, in this example, then sends the organization identifier, interaction category, timestamp, and interaction activity to metric processing module 240. Continuing in this example, metric processing module 240 may query non-relational database 210 based on the timestamp and interaction category. Module 240 may also pass the organization identifier, interaction category, and interaction activity to cumulative metric processing module 250, which determines a cumulative count for these three specified characteristics based on querying the relational database 220 for daily counts that match these interaction characteristics. Note that FIG. 5 shows example relational database entries based on example interaction data and the techniques of FIG. 2.

Figure 3:
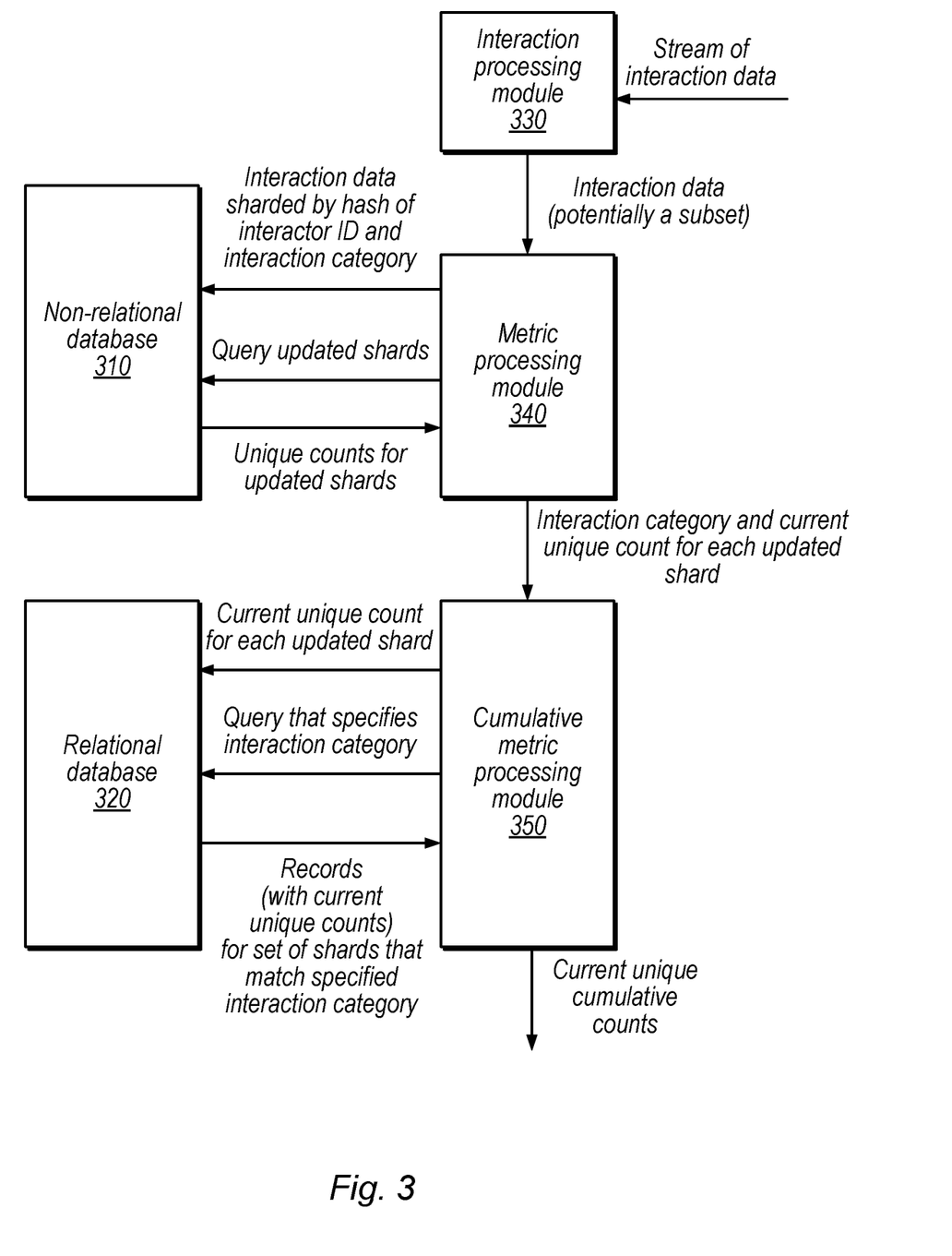
FIG. 3 is a block diagram illustrating example processing modules configured to determine current cumulative unique counts for a stream of interaction data, according to some embodiments.

FIG. 3 is a block diagram illustrating example processing modules configured to determine current cumulative unique counts for a stream of interaction data, according to some embodiments. In the illustrated embodiment, similar to the system shown in FIG. 2, a non-relational database 310 and a relational database 320 store interaction data and unique metrics, respectively, while processing modules 230, 240, and 250 process a stream of interaction data. Note that the elements shown in FIG. 3 may be configured similarly to corresponding elements shown in FIG. 2, unless otherwise specified below. Note that the example of FIG. 2 provides cumulative metrics that may be based on duplicate interactions by the same interactor. In contrast, the example of FIG. 3 provides cumulative metrics in which multiple interactions by the same interactor in the same interaction category are consolidated and considered as one action (e.g., for counting purposes). Unique or non-unique metrics may be considered more useful in various situations, and in some embodiments the system may be configured to generate both (e.g., as discussed below with reference to FIG. 4).

Interaction processing module 330, in the illustrated embodiment, receives a stream of interaction data and provides the interaction data to metric processing module 340. In some embodiments, interaction processing module 330 provides a subset of the received interaction data to metric processing module 340. In some embodiments, module 330 provides interaction data in real time. For example, as interaction processing module 330 receives new interaction data it passes this data to metric processing module 340.

As used herein, the term "subset" refers to a portion that is less than the entirety of a set of interaction data. For example, if a set of interaction data includes information for interaction characteristics A, B, and C, a subset of the set of interaction data may include information for characteristics A and B, or information for characteristics of A, B, and a portion of characteristic C. In some embodiments, an interaction processing module may send the entirety of a set of received interaction data to a metric processing module rather than a subset of the set of interaction data.

As metric processing module 340 receives additional interaction data, it shards the data by interaction category and a hash of the interactor identifier. In some embodiments, metric processing module 340 shards the data based on additional interaction characteristics. Once module 340 has determined a shard identifier for the interaction data, module 340 determines whether an entry in that shard for the interactor already exists and does not update the shard in this case. If an entry in that shard for the interactor does not yet exist, module 340 adds an entry. For example, if metric processing module 340 receives interaction data for two interactions with a matching set or subset of interaction characteristics, the module will maintain or store data for only one of these interactions.

Note that, in contrast to the process in FIG. 2, metric processing module 340 controls storing of interaction data in the non-relational database 310, which may allow this module to prevent the storing of duplicate entries. Metric processing module 340, in the illustrated example, queries shards that were updated by storing the additional interaction data to determine current unique counts for those shards. Metric processing module 340 then sends an interaction category and a current unique count for each updated shard to cumulative metric processing module 350, in the illustrated embodiment.

Cumulative metric processing module 350, in the illustrated embodiment, stores current unique counts for each updated shard in relational database 320. After storing the current unique counts, processing module 350 queries relational database 320, specifying an interaction category received from metric processing module 340. Module 350 then receives records with current unique counts for a set of shards that match the specified interaction category. Based on the received records, cumulative metric processing module 350 determines cumulative unique counts for the specified interaction category. In some embodiments, module 350 submits multiple queries to relational database 320 that specify different interaction categories and determines cumulative unique counts for each interaction category. In the illustrated embodiment, cumulative metric processing module 350 outputs current cumulative unique counts.

Figure 6:
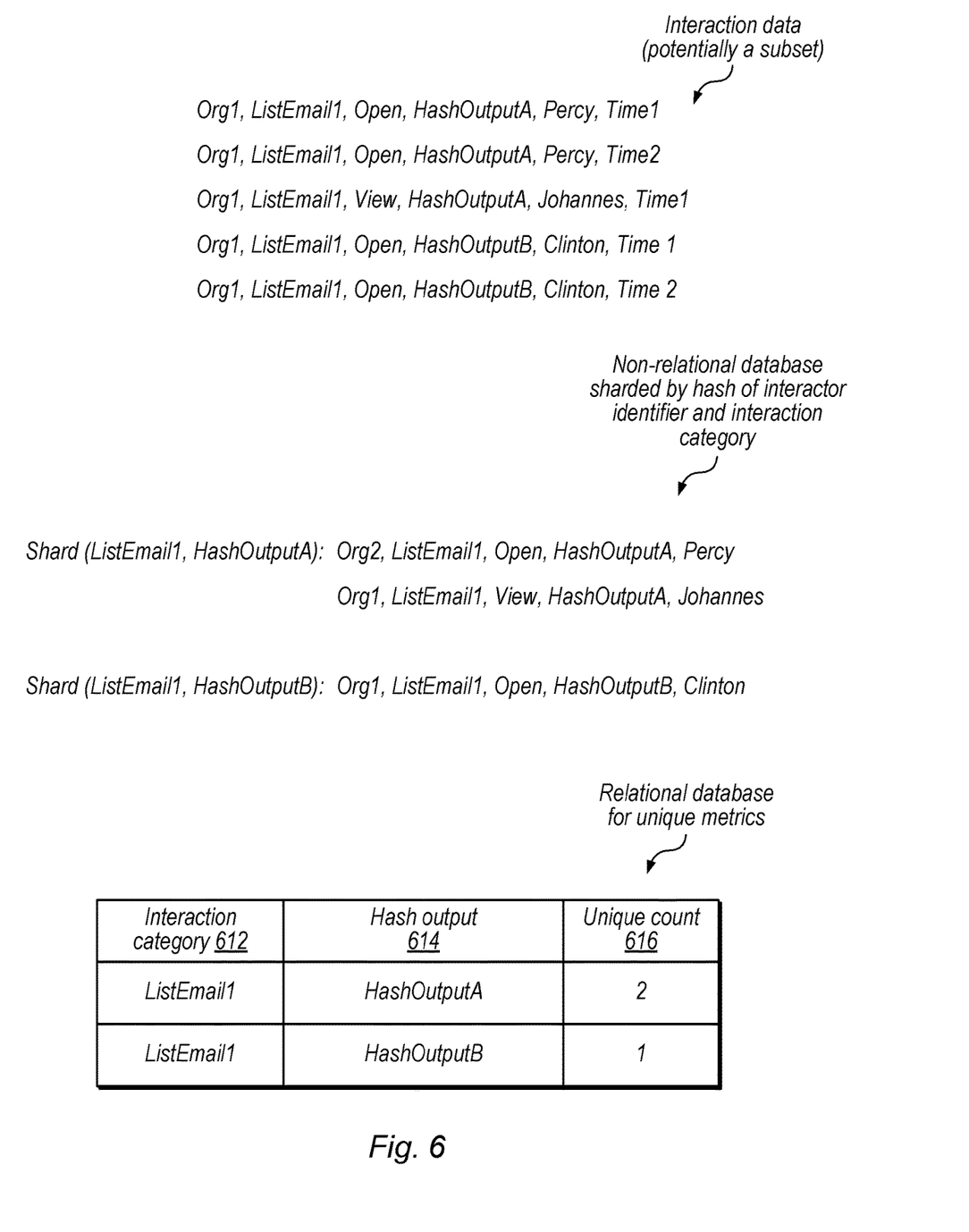
FIG. 6 is a diagram illustrating example interaction data, non-relational database shard contents, and a schema and contents of a relational database configured to store unique metrics for a stream of interaction data, according to some embodiments.

As one specific example, interaction processing module 330 may receive a set of interaction data for each interaction event with the following interaction characteristics: an organization identifier, interaction category, timestamp, interaction activity, and interactor identifier. Metric processing module 340 may determine a hash of the interactor identifier included in the set of interaction characteristics. Continuing in this example, interaction processing module 330 sends a subset of the set of interaction data for each interaction event to metric processing module 340. The subset includes, for each interaction event, an organization identifier, an interaction category, an interaction activity, as well as the hash of the interactor identifier. Further in this example, each entry in non-relational database 310 includes the following: an organization identifier, an interaction category, an interaction activity, and a hash output. In this specific example, module 340 queries non-relational database 310 based on the organization identifier, interaction category, interaction activity, and determined hash of the interactor identifier. Note that metric processing module 340 sends the subset of interaction data along with the determined hash value to the cumulative metric processing module 350. Finally, in this example, cumulative metric processing module 350 queries relational database 320 specifying an organization identifier, an interaction category, and an interaction activity. Note that FIG. 6 shows example relational database entries based on example interaction data and the techniques of FIG. 3.

In some embodiments, metric processing module 340 hashes an interaction characteristic for an interaction event (e.g., the interactor identifier) to facilitate sharding. For example, module 340 may use the following equation to generate at most a pre-determined number of shards per interaction category (#shards) in the example of FIG. 3:

$$\text{hash output} = \text{hash}(\text{interactor identifier})\%(\text{\#shards})$$

In some embodiments, metric processing module 340 hashes the interaction category for an interaction event. Note that any of various hashing functions may be used to determine a hash of the interactor identifier for interaction events. The number of shards included in a non-relational database may be referred to as the bucket count, e.g., in the context of a Cassandra database.

Figure 4:
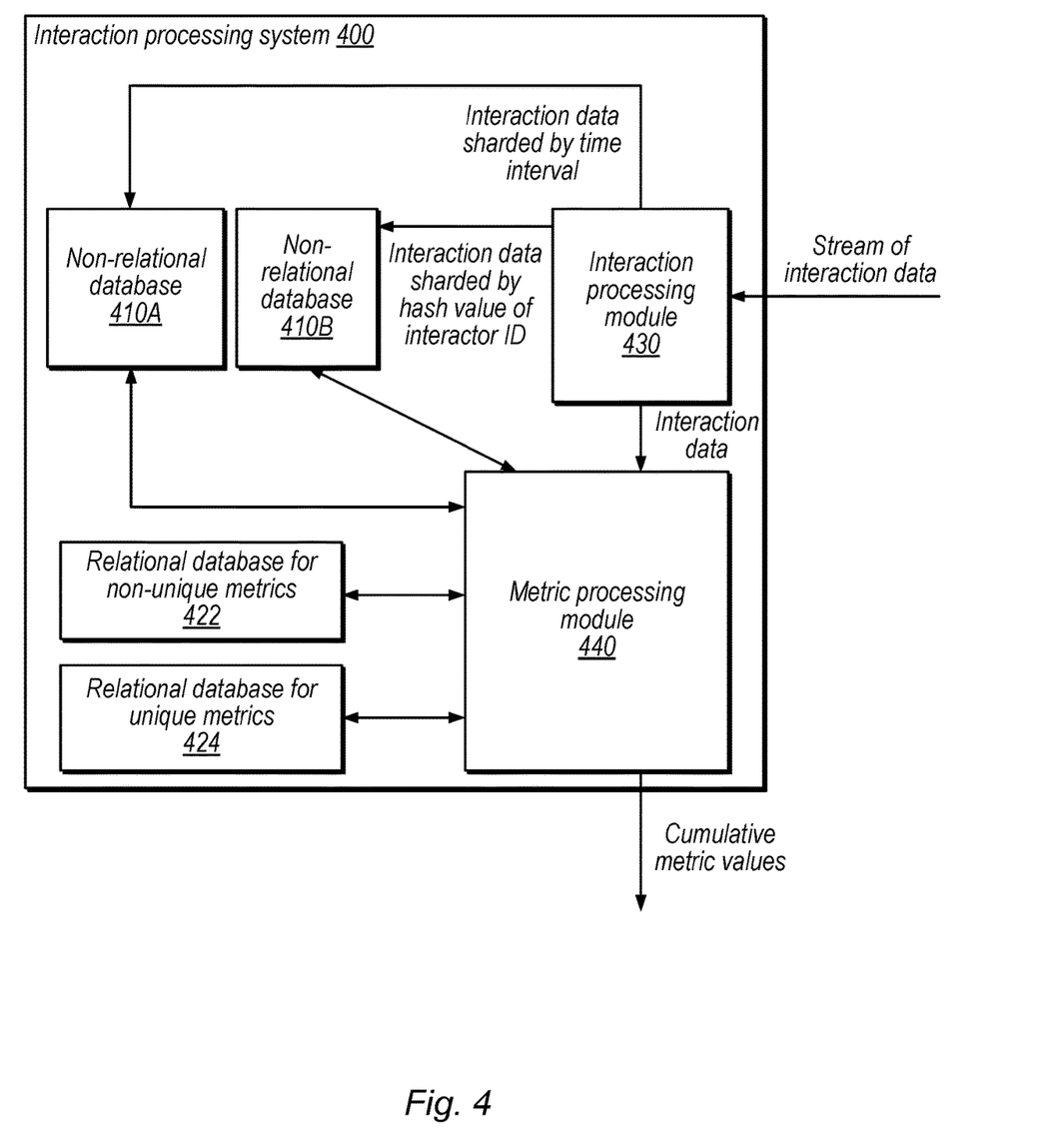
FIG. 4 is a block diagram illustrating an example interaction processing system with two relational databases that store non-unique and unique metrics, respectively, according to some embodiments.

FIG. 4 is a block diagram illustrating an example interaction processing system with two relational databases that store non-unique and unique metrics, respectively, according to some embodiments. In the illustrated embodiment, interaction processing system 400 includes an interaction processing module 430, non-relational databases 410A and 410B, metric processing module 440, and relational databases 422 and 424. Interaction processing system 400 receives, via interaction processing module 430, a stream of interaction data. In the illustrated example, interaction processing module 430 stores information for a given interaction in both of the two different non-relational databases. In the illustrated embodiment, the system stores interaction data that is sharded by time interval in non-relational database 410A and also stores interaction data for the same interaction stream, sharded by hash of interactor identifier, in non-relational database 410B. Interaction processing system 400 may include any appropriate number of non-relational databases, e.g., to support sharding that facilitates calculation of any number of different types of metrics.

As metric processing module 440 determines intermediate per-shard non-unique and unique metrics, it stores these metrics in respective relational databases 422 and 424. Note that the schemas for databases 422 and 424 may be different based on the different types of metrics (or different types of interaction characteristics associated with the metrics). Example schemas for databases 422 and 424 are shown in FIGS. 5 and 6. In some embodiments, interaction processing system 400 includes multiple relational databases for different types of unique metrics for any given interaction characteristics (e.g., unique counts per associated software resources, per interaction activity, etc.). Metric processing module 440, in the illustrated example, determines both cumulative non-unique and cumulative unique metrics based on the intermediate metrics stored in databases 422 and 424 and outputs values for both types of cumulative metrics.

Example Database Schema

FIG. 5 is a diagram illustrating example contents of non-relational database shards and a schema and contents of a relational database configured to store non-unique metrics for a stream of interaction data, according to some embodiments. In the illustrated embodiment, the system stores interaction data for five example interaction events in the example non-relational database that is sharded by the date on which interaction events occur as well as the email list (one example of an interaction category) associated with the event. In FIG. 5, three example shards are shown, one shard for ListEmail1 and day 1, another shard for ListEmail1 and day 10, and a third shard for ListEmail4 and day 1. In the illustrated example, each entry in a shard includes information for four different interaction characteristics for each interaction event (organization, interaction category, day, interaction activity, and interactor identifier). Note that, in some embodiments, interaction characteristics that are part of the shard identifier may not actually be stored in shard entries, e.g., because this information can be implied based on the shard identifier.

In the illustrated embodiment, the first shard includes interaction events for ListEmail1 that occurred on day 1. For example, the first shard includes two interaction events with the following interaction characteristic values: Org1, ListEmail1, Day 1, Open, and Percy and Org1, ListEmail1, Day 1, Open, and Clinton. In this example, users Percy and Clinton associated with organization 1 opened an email on Day 1. The email, in this example, was sent to all email addresses included in ListEmail1. Additionally, in this example, the two interaction events stored in the first shard have the same organization identifier and interaction activity. In other situations, however, interaction events with different organization identifiers and interaction activities may be stored in the same shard, as long as they have the same interaction category and timestamp (according to the sharding in the example figure).

Similarly, the second shard of the non-relational database that is sharded by time interval and interaction category includes a single entry for an email that was opened on day 10. Note that the email that was opened on day 10 was sent based on the same email list as the entries stored in the first shard, but is stored in a different shard than these entries due to the sharding by date.

Finally, the third shard in the example non-relational database includes three interaction events associated with ListEmail4. In this example, emails sent to ListEmail4 resulted in two interactions in which emails were opened and one interaction in which a link was clicked within an email. Note that, although these three interaction events occur on the same date as the interaction events stored in the first shard, they are recorded for a different email list than the interaction events stored in the first shard and, therefore, are stored in a different shard. In addition, in this example, the organization identifier (Org3) is different for the first interaction event stored in the third shard than for the other two interaction events stored in the third shard. Note that information for two different interaction events associated with Percy are stored in the third shard, while information for a single interaction event associated with Clinton is also stored in the third shard.

In the illustrated example, a relational database stores non-unique counts for interactions with certain matching interaction characteristics. Rows in the example relational database include a field 512 for an interaction category, a field 514 for the day on which one or more interactions occur, the non-unique count 516 for each interaction category on that day, and an interaction activity 518. In the illustrated example, each row of the relational database corresponds to a shard of the non-relational database. In this example, the entries stored in a shard of the example non-relational database are considered in the non-unique count for that shard. The example non-relational and relational database content shown in FIG. 5 may include fields for any number of interaction characteristics and are not limited to the characteristics shown. In embodiments with additional fields (in addition to fields corresponding to shard information), a subset of entries in a given shard (e.g., entries that match specified field values) may be used to generate a desired type of count.

In the illustrated example, non-unique counts 516 are shown for different interaction activities and interaction category combinations. Specifically, in the illustrated example, a cumulative non-unique count for the "Open" activity for ListEmail4 is 2, while the cumulative non-unique count for the "LinkClick" activity for ListEmail4 is 1. In other examples, a cumulative non-unique count may be determined for a given interaction category. For example, the cumulative non-unique count for interaction events associated with ListEmail1 is 3 (the sum of the non-unique counts of rows 1 and 2 of the relational database table). As another example, the cumulative non-unique count for interaction events associated with ListEmail4 is also 3 (the sum of the non-unique counts for rows 3 and 4 of the relational database table). In some embodiments, a cumulative non-unique count is determined for respective shards of the non-relational database. For example, the cumulative non-unique count for the third shard in the non-relational database shown in the illustrated example is 3 (the total number of entries in the third shard).

Note that while counts are maintained for each interaction category and day, in the illustrated embodiment, the relational database may store counts at various different granularities in different embodiments. For example, the relational database may include fields for multiple different interaction characteristics and may maintain separate rows and counts for different sets of interactions in the same shard. As another example, the non-relational database may be sharded based on other or additional interaction characteristics such that counts in the relational database for each shard are at a finer granularity. As specific examples in the context of FIG. 5, the system may maintain separate counts for different interaction activities (e.g., LinkClick and Open) or different organizations (e.g., Org3 and Org1). For example, interaction activity or organization may be added to the shard identifiers, or these fields may be added to the relational database. Note that the various example values for interaction characteristics in FIGS. 5 and 6 are included for purposes of illustration, but are not intended to limit the scope of the present disclosure.

FIG. 6 is a diagram illustrating example interaction data, non-relational database shard contents, and a schema and contents of a relational database configured to store unique metrics for a stream of interaction data, according to some embodiments. In the illustrated embodiment, the system stores interaction data for various interaction events in the example non-relational database that is sharded by hash of interactor identifier as well as the email list associated with the event. In FIG. 6, interaction data (which may be a subset of the interaction data available in the stream of interaction data) is shown for five different interaction events. In this example, the interaction information includes values for the following interaction characteristics: organization identifier, interaction category, interaction activity, hash of interactor identifier, interactor identifier, and timestamp.

In the illustrated example, the system uses two shards of the non-relational database to store interaction data for the five interaction events. In particular, the system stores two entries in the first shard of the non-relational database, which corresponds to interaction characteristics ListEmail1 and HashOutputA. Of the two interaction events associated with Percy, for example, information for only one is stored in the non-relational database (e.g., because metric processing module 340 removes duplicate interactions before storing the data). Although Johannes has the same hash output as Percy, he has a different interactor identifier and therefore the system stores the interaction information for Johannes' interaction in the non-relational database in the same shard corresponding to the hash of Johannes (HashOutputA) and ListEmail1. Finally, two interaction events (recorded at different times) are shown for Clinton. In the illustrated example, however, one of the two interaction events that are associated with Clinton is stored in the second shard of the non-relational database because the interactions are for the same interactor and interaction category. Note that hashing the interactor identifiers may result in the system storing interaction events for different users (e.g., Percy and Johannes) in the same shard.

Unique interaction metrics and information for interaction characteristics are stored in rows of a relational database, in the illustrated embodiment. The following fields are included in the relational database: interaction category 612, hash 614 of interactor identifier, and unique count 616. In the illustrated embodiment, the count for ListEmail1 and HashOutputA is 2, while the count for ListEmail1 and HashOutputB is 1. In some embodiments, the cumulative unique count may be determined based on the organization identifier, interaction category, and interaction activity included in the records of the relational database. In the illustrated example, the unique cumulative count for ListEmail1 is 3. As discussed above with reference to FIG. 5, the non-relational database may be sharded at various granularities or additional fields may be included in the relational database in order to allow querying the relational database for more specific cumulative counts, in various embodiments.

In some embodiments, the shards of the non-relational database (e.g., database 210 or database 310) include various additional interaction characteristics for each interaction event. For example, additional interaction characteristics stored within shards of the non-relational database may include: an event key, a tenant identifier, cookie data, login credentials, survey results, etc. Thus, various information included in the stream of interaction data may be stored within the shards of the non-relational database.

Example Method

Figure 7:
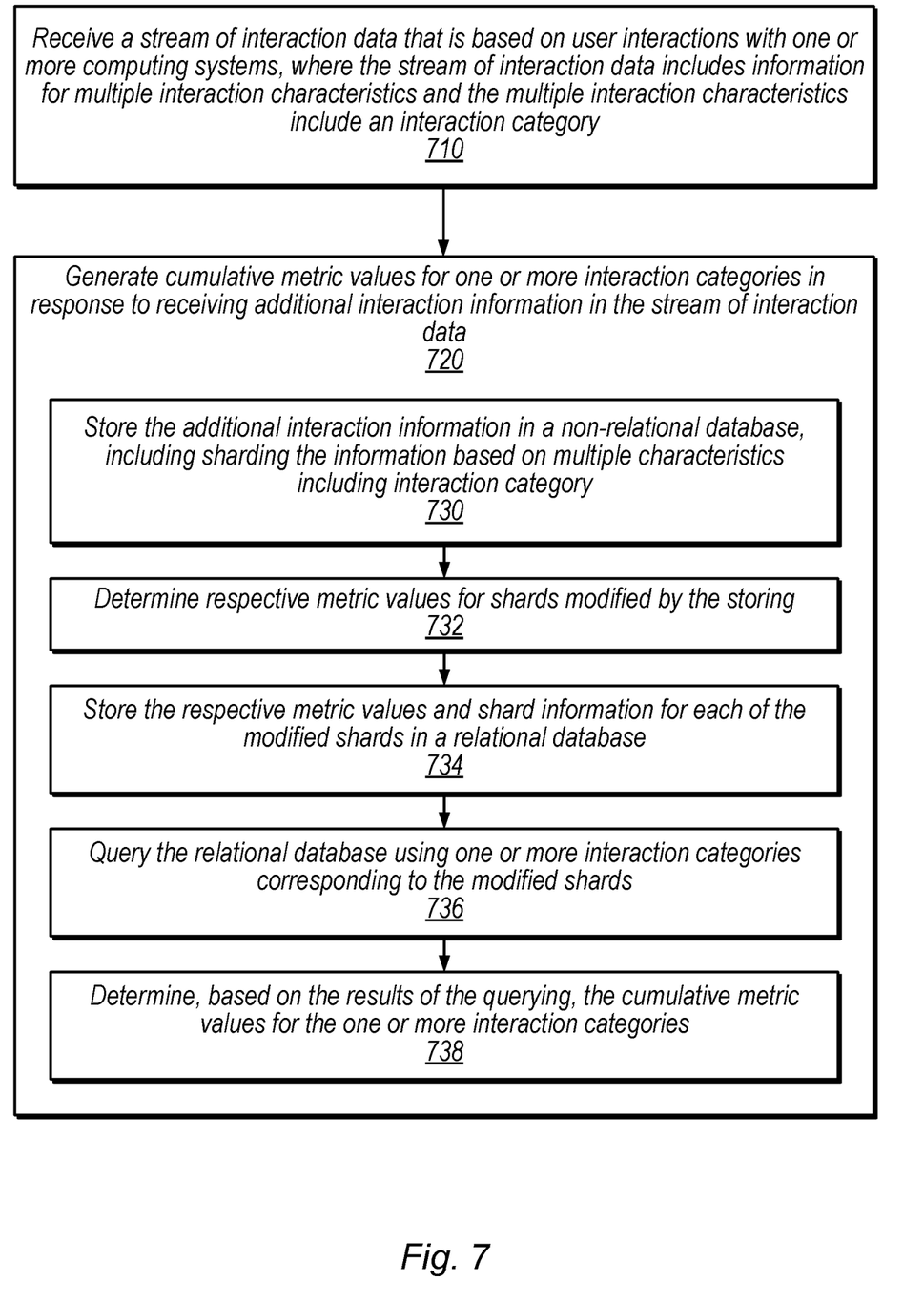
FIG. 7 is a flow diagram illustrating a method for generating cumulative metric values for a stream of interaction data using a relational database to store metric values for shards of a non-relational database, according to some embodiments.

FIG. 7 is a flow diagram illustrating an example method for generating cumulative metric values for a stream of interaction data using a relational database to store metric values for shards of a non-relational database, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a computing system receives a stream of interaction data that is based on user interactions with one or more computing systems, where the stream of interaction data includes information for multiple interaction characteristics and the multiple interaction characteristics include an interaction category. The server system(s) 114 shown in FIG. 1 are one example of the one or more computing systems with which users interact to generate a stream of interaction data. In some embodiments, the multiple interaction characteristics further include a time interval and the additional interaction information is sharded based on at least time interval and interaction category. In some embodiments, the multiple interaction characteristics further include an interactor identifier and the additional interaction information is sharded based on at least interactor identifier and interaction category. In some embodiments, the multiple interaction characteristics further include an interactor identifier and the additional interaction information is sharded based on at least a hash of the interactor identifier and interaction category.

At 720 the computing system generates cumulative metric values for one or more interaction categories in response to receiving additional interaction information in the stream of interaction data.

At 730 the computing system stores the additional interaction information in a non-relational database, including sharding the information based on multiple characteristics including interaction category. In some embodiments, the system stores the additional interaction information in both first and second non-relational databases, including sharding the information stored in the first non-relational database based on a first set of interaction characteristics and sharding the information stored in the second non-relational database based on a second, different set of interaction characteristics. In some embodiments, the first non-relational database stores information for multiple interactions by a first interactor having a first interaction category. In some embodiments, the second set of interaction characteristics includes an interaction characteristic that is based on interactor identifier and the second non-relational database stores information for only one of the multiple interactions by the first interactor. In various embodiments, considering various interaction characteristics may allow for unique metrics for those characteristics, e.g., be allowing duplication avoidance when storing information in shards. In some embodiments, the multiple interaction characteristics on which the sharding is based further include one or more of: time interval, associated software resources, interaction activity, or interactor identifier.

At 732 the computing system determines respective metric values for shards modified by the storing. In some embodiments, the determining the respective metric values for shards modified by the storing includes querying the non-relational database. In some embodiments, the respective metric values include respective counts of interactions for which interaction information is stored in the modified shards.

At 734 the computing system stores the respective metric values and shard information for each of the modified shards in a relational database.

At 736 the computing system queries the relational database using one or more interaction categories corresponding to the modified shards.

At 738 the computing system determines, based on the results of the querying, the cumulative metric values for the one or more interaction categories. In some embodiments, the system adjusts one or more parameters for the one or more computing systems based on the cumulative metric values.

Example Computing Device

Figure 8:
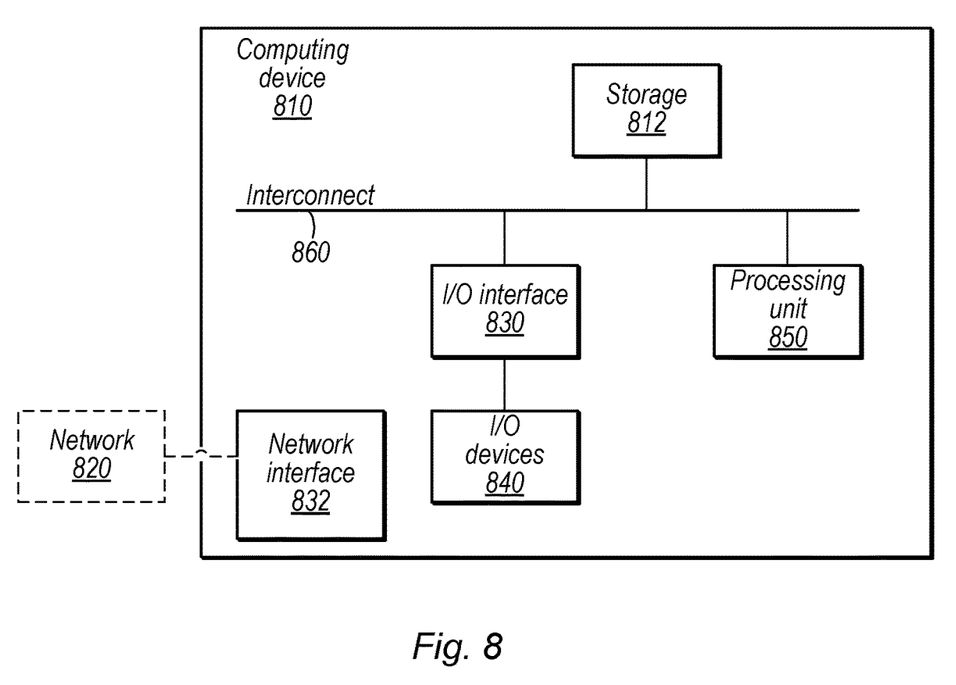
FIG. 8 is a block diagram illustrating an example computing device, according to some embodiments.

Turning now to FIG. 8, a block diagram of a computing device (which may also be referred to as a computing system) 810 is depicted, according to some embodiments. Computing device 810 may be used to implement various portions of this disclosure. Computing device 810 is one example of a device that may be used as a mobile device, a server computer system, a client computer system, or any other computing system implementing portions of this disclosure.

Computing device 810 may be any suitable type of device, including, but not limited to, a personal computer system, desktop computer, laptop or notebook computer, mobile phone, mainframe computer system, web server, workstation, or network computer. As shown, computing device 810 includes processing unit 850, storage subsystem 812, and input/output (I/O) interface 830 coupled via interconnect 860 (e.g., a system bus). I/O interface 830 may be coupled to one or more I/O devices 840. Computing device 810 further includes network interface 832, which may be coupled to network 820 for communications with, for example, other computing devices.

Processing unit 850 includes one or more processors, and in some embodiments, includes one or more coprocessor units. In some embodiments, multiple instances of processing unit 850 may be coupled to interconnect 860. Processing unit 850 (or each processor within processing unit 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

As used herein, the terms "processing unit" or "processing element" refer to circuitry configured to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory in some embodiments. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In some embodiments, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 8 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    receiving, by a computing system, a stream of interaction data that is based on user interactions with one or more computing systems, wherein the stream of interaction data includes information for multiple interaction characteristics, wherein the multiple interaction characteristics include an interaction category;
    generating, by the computing system, cumulative metric values for one or more interaction categories in response to receiving additional interaction information in the stream of interaction data, wherein the generating includes:
        storing the additional interaction information in a non-relational database, including sharding the information based on multiple characteristics including interaction category;
        determining respective metric values for shards modified by the storing;
        storing the respective metric values and shard information for each of the modified shards in a relational database;
        querying the relational database using one or more interaction categories corresponding to the modified shards; and
        determining, based on results of the querying, the cumulative metric values for the one or more interaction categories.

2. The method of claim 1, wherein the multiple interaction characteristics further include a time interval and wherein the additional interaction information is sharded based on at least time interval and interaction category.

3. The method of claim 1, wherein the multiple interaction characteristics further include an interactor identifier and wherein the additional interaction information is sharded based on at least interactor identifier and interaction category.

4. The method of claim 1, further comprising:
    storing the additional interaction information in both first and second non-relational databases, including sharding the information stored in the first non-relational database based on a first set of interaction characteristics and sharding the information stored in the second non-relational database based on a second, different set of interaction characteristics.

5. The method of claim 1, wherein the multiple interaction characteristics on which the sharding is based further include one or more of: time interval, associated software resources, interaction activity, or interactor identifier.

6. The method of claim 1, wherein the determining the respective metric values for shards modified by the storing includes querying the non-relational database.

7. The method of claim 1, wherein the respective metric values include respective counts of interactions for which interaction information is stored in the modified shards.

8. The method of claim 1, further, comprising:
    adjusting one or more parameters for the one or more computing systems based on the cumulative metric values.

9. A non-transitory computer-readable medium having instructions stored thereon that are capable of execution by a computing device to perform operations comprising:
    receiving a stream of interaction data that is based on user interactions with one or more computing systems, wherein the stream of interaction data includes information for multiple interaction characteristics, wherein the multiple interaction characteristics include an interaction category;
generating cumulative metric values for one or more interaction categories in response to receiving additional interaction information in the stream of interaction data, wherein the generating includes:
storing the additional interaction information in a non-relational database, including sharding the information based on multiple characteristics including interaction category;
determining respective metric values for shards modified by the storing;
storing the respective metric values and shard information for each of the modified shards in a relational database;
querying the relational database using one or more interaction categories corresponding to the modified shards; and
determining, based on results of the querying, the cumulative metric values for the one or more interaction categories.

10. The non-transitory computer-readable medium of claim 9, wherein the multiple interaction characteristics further include a time interval and wherein the additional interaction information is sharded based on at least time interval and interaction category.

11. The non-transitory computer-readable medium of claim 9, wherein the multiple interaction characteristics further include an interactor identifier and wherein the additional interaction information is sharded based on at least interactor identifier and interaction category.

12. The non-transitory computer-readable medium of claim 9, wherein the multiple interaction characteristics further include an interactor identifier and wherein the additional interaction information is sharded based on at least a hash of the interactor identifier and interaction category.

13. The non-transitory computer-readable medium of claim 9, wherein the operations further comprise:
storing the additional interaction information in both first and second non-relational databases, including sharding the information stored in the first non-relational database based on a first set of interaction characteristics and sharding the information stored in the second non-relational database based on a second, different set of interaction characteristics.

14. The non-transitory computer-readable medium of claim 13,
wherein the first non-relational database stores information for multiple interactions by a first interactor having a first interaction category;
wherein the second set of interaction characteristics includes an interaction characteristic that is based on interactor identifiers and wherein the second non-relational database stores information for only one of the multiple interactions by the first interactor.

15. The non-transitory computer-readable medium of claim 9, wherein the multiple interaction characteristics on which the sharding is based further include one or more of: time interval, associated software resources, interaction activity, or interactor identifier.

16. The non-transitory computer-readable medium of claim 9, wherein the respective metric values include respective counts of interactions for which interaction information is stored in the modified shards.

17. The non-transitory computer-readable medium of claim 9, wherein the operations further comprise:
adjusting one or more parameters for the one or more computing systems based on the cumulative metric values.

18. A system, comprising:
one or more processors; and
one or more storage elements having program instructions stored thereon that are executable by the one or more processors to:
receiving a stream of interaction data that is based on user interactions with one or more computing systems, wherein the stream of interaction data includes information for multiple interaction characteristics, wherein the multiple interaction characteristics include an interaction category;
generating cumulative metric values for one or more interaction categories in response to receiving additional interaction information in the stream of interaction data, wherein the generating includes:
storing the additional interaction information in a non-relational database, including sharding the information based on multiple characteristics including interaction category;
determining respective metric values for shards modified by the storing;
storing the respective metric values and shard information for each of the modified shards in a relational database;
querying the relational database using one or more interaction categories corresponding to the modified shards; and
determining, based on results of the querying, the cumulative metric values for the one or more interaction categories.

19. The system of claim 18, wherein the multiple interaction characteristics further include a time interval and wherein the additional interaction information is sharded based on at least time interval and interaction category.

20. The system of claim 18, wherein the multiple interaction characteristics further include an interactor identifier and wherein the additional interaction information is sharded based on at least interactor identifier and interaction category.

* * * * *